Aug. 25, 1931.  E. S. KING  1,820,075
VALVE
Filed Nov. 26, 1929   3 Sheets-Sheet 1

Inventor
Edward S. King,
By Clarence A. O'Brien
Attorney

Aug. 25, 1931.  E. S. KING  1,820,075

VALVE

Filed Nov. 26, 1929   3 Sheets-Sheet 2

Inventor
Edward S. King,

By Clarence A. O'Brien
Attorney

Aug. 25, 1931.  E. S. KING  1,820,075
VALVE
Filed Nov. 26, 1929   3 Sheets-Sheet 3
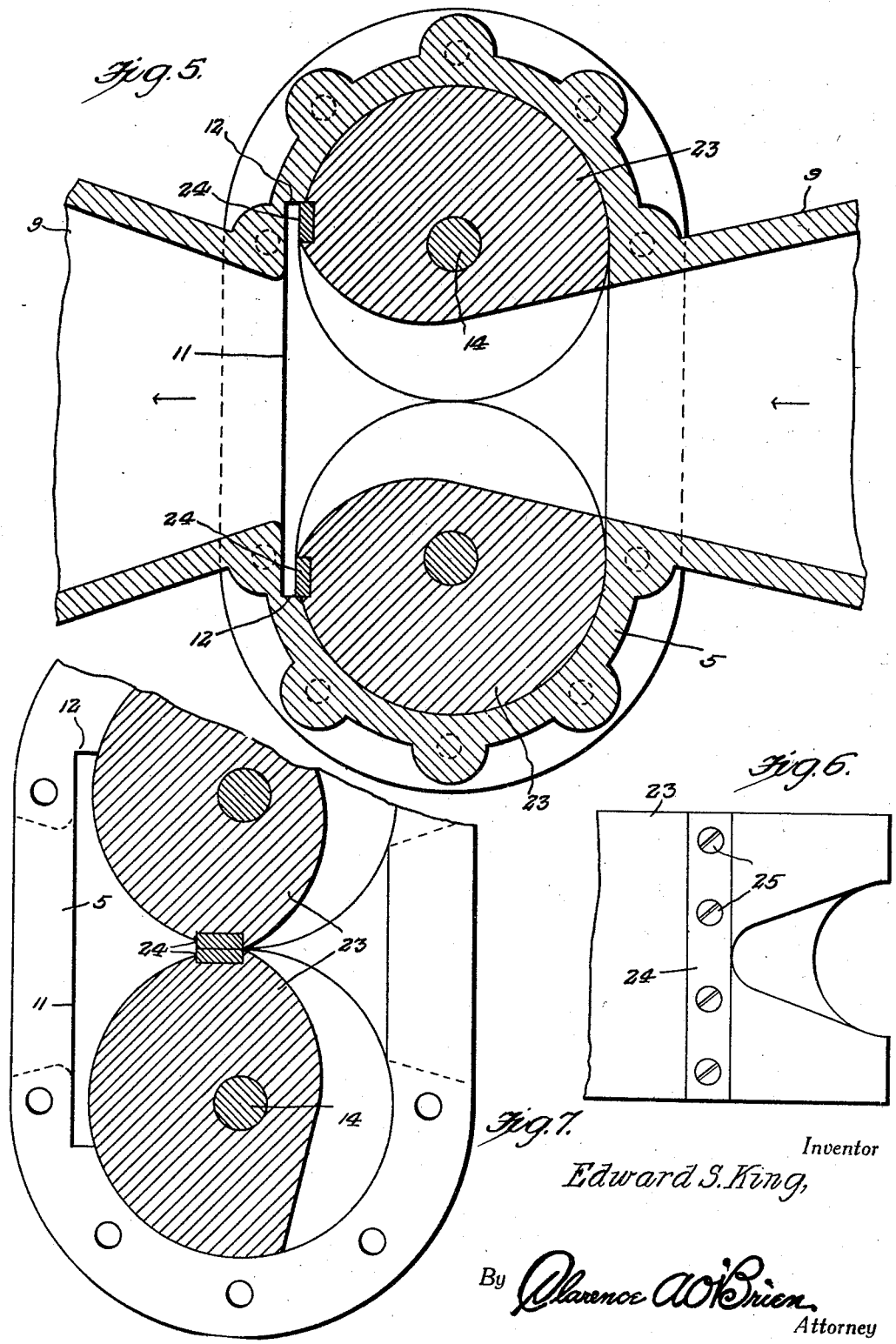
Inventor
Edward S. King,
By Clarence A. O'Brien
Attorney Patented Aug. 25, 1931

1,820,075

UNITED STATES PATENT OFFICE

EDWARD S. KING, OF KANSAS CITY, MISSOURI

VALVE

Application filed November 26, 1929. Serial No. 409,883.

This invention appertains to new and useful improvements in valves, and more particularly to a valve for the distribution of water in cities and hydraulic power plants, in crude oil pipe lines, and diverse other uses.

The principal object of this invention is to provide a valve capable of fully or partially opening or closing in response to a slight movement of its control, either through the agency of motive power or manual actuation.

During the course of the following specification and claim, other important objects and advantages of the invention will readily become apparent to the reader.

In the drawings:

Figure 5 represents a fragmentary horizontal sectional view through the valve structure showing the rotary elements in open position.

Figure 6 represents a fragmentary side elevational view of one of the rotary elements.

Figure 7 represents a horizontal sectional view through the valve unit showing the rotary elements in closed position.

Figure 1:
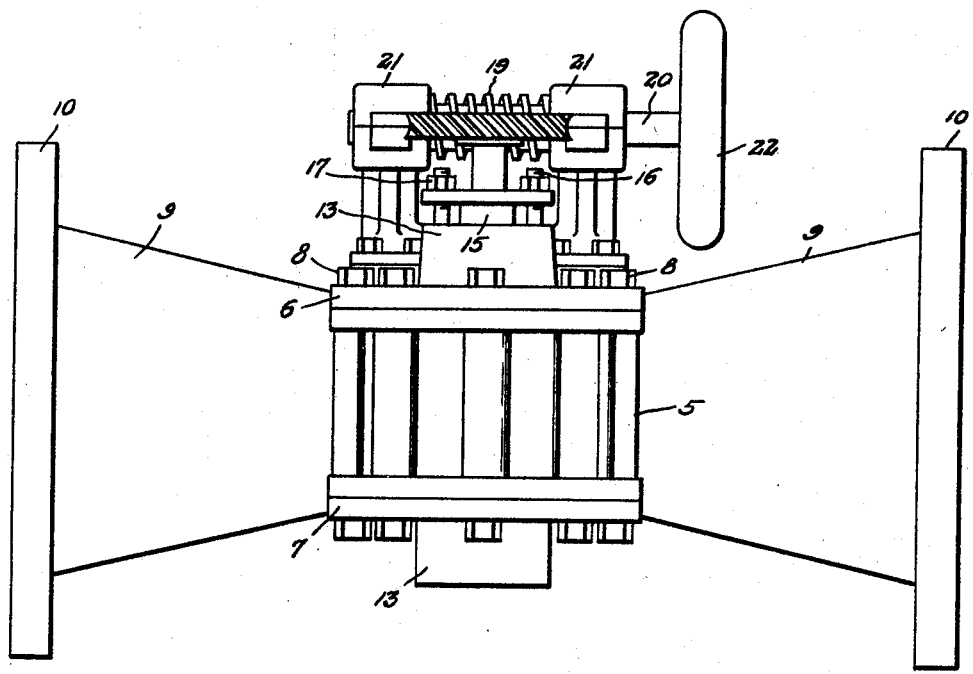
Figure 1 represents a side elevational view of the novel valve unit.
Figure 4:
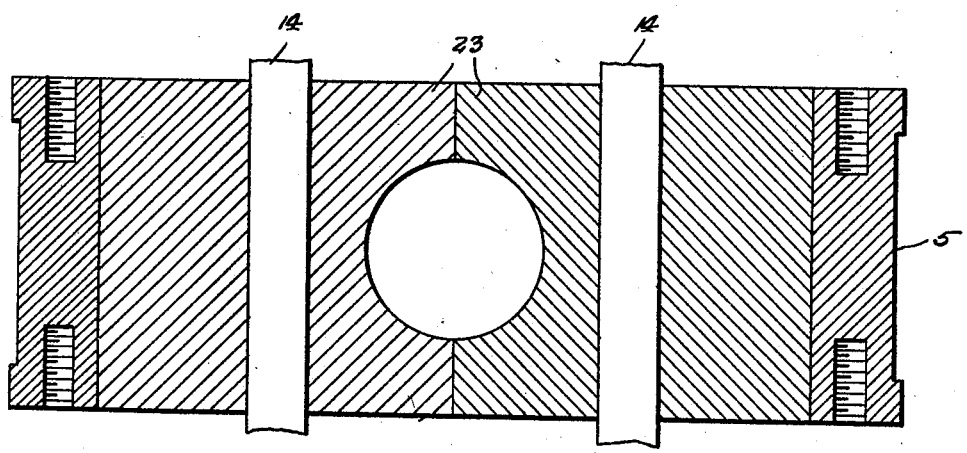
Figure 4 represents a fragmentary detail sectional view.
Figure 2:
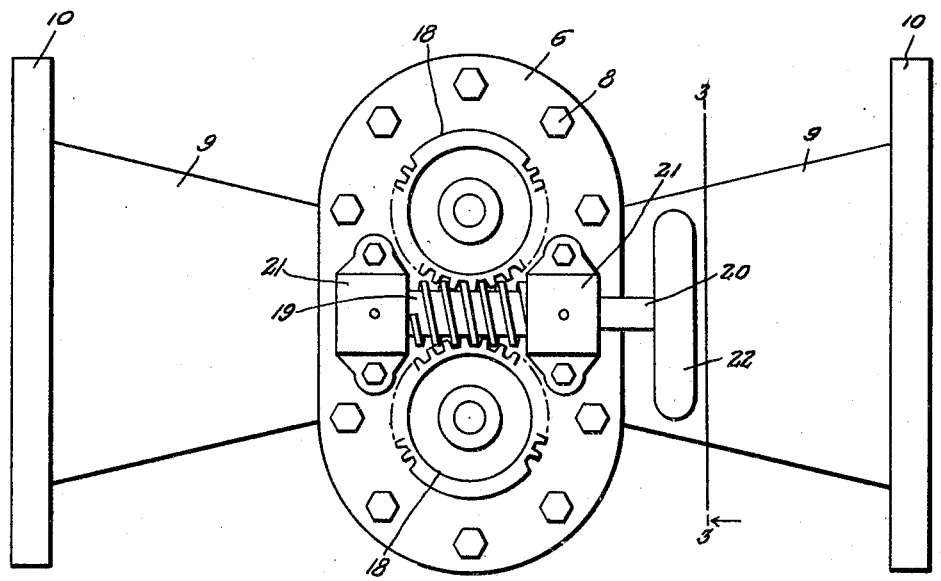
Figure 2 represents a top plan view of the valve unit.
Figure 3:
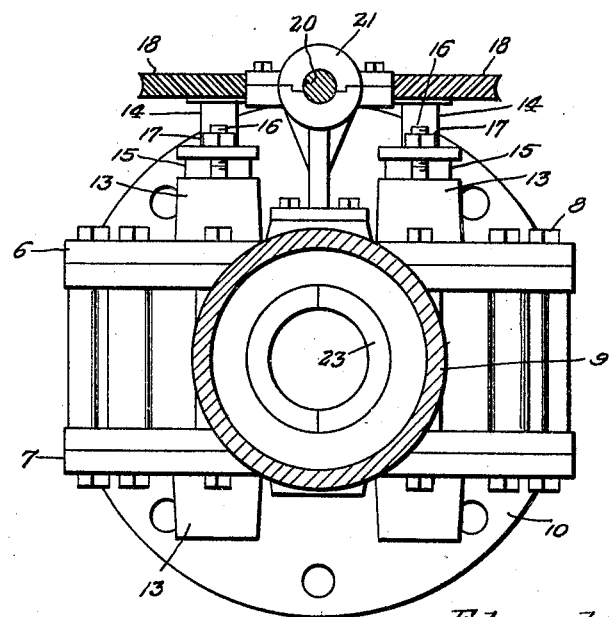
Figure 3 represents a cross sectional view though the valve unit taken substantially on line 3—3 of Figure 2.

Referring to the drawings, wherein like numerals designate like parts, it can be seen that the invention includes an ovate-shaped casing 5 open at its top and bottom sides. Headers 6 and 7 are provided at the top and bottom sides of the casing and are secured against the casing by bolts 8. Projecting from opposite sides of the ovate casing 5 are the inwardly tapering pipe extensions 9—9, each flanged at its outer end as at 10. On the inner side of the casing 5 adjacent one of the pipe extensions 9 are shoulders 12—12 which serve as stops for the valve elements when the valve is in its maximum wide open position.

Each header has a pair of bearings 13—13 projecting outwardly therefrom and projecting upwardly through each vertically aligned pair of bearings is a shaft 14. The bearings 13 on the header 7 are preferably closed at their outer ends while the bearings 13 on the upper headers 6 are open at their outer ends so as to permit the shafts 14 to project upwardly. Packing elements 15 circumscribe the shaft 14 at the open ends of the bearings 13 of the upper header 6 and screws and nuts 16 and 17 respectively serve to secure this packing in place, as in the manner clearly shown.

The upper end of each shaft 14 is provided with a flat worm wheel 18 for mesh with the worm 19 on the shaft 20. This shaft 20 is journalled through the bearings 21—21 which are also located upon the upper header 6 and this shaft is provided with a handwheel 22 at one end so that the same may be rotated, which in turn obviously rotates the worm gears 18—18 and their corresponding shafts 14.

As is clearly shown in Figure 5, a pair of rotary rolls 23—23 are located within the ovate casing 5 in rolling contact with each other and snugly fitting within the ends of the casing. Each of these rolls is secured to one of the shafts 14 and each of the rolls has a strip 24 secured longitudinally thereto by means of screws 25. One edge of each strip protrudes beyond the peripheries of its corresponding roll so as to abut one of the shoulders 12 when the roll is in open position, as shown in Figure 5, and which are adapted to abut each other when the rolls are in closed position, as shown in Figure 7. These strips serve as a complete and positive non-leakable valve seat when the valve is in closed position.

Each of the rolls 23 is provided with a groove which extends substantialy one-half the distance around the circumference of the roll and which is shaped in the manner shown in Figure 5 so that when the rolls are in open position, the combined grooves form a circular orifice, and this orifice may be changed in size to vary the amount of water passing therethrough by the operating means stated.

It will thus be seen that the opening between the two valve elements may be constricted or enlarged to regulate the flow through a minimum movement of the valve element. It will also be observed that the strip on the rolls when abutting the shoulders, limits the movement of the rolls and when they are brought into contact with each other (see Fig. 7), they perform as a seat to prevent passage of water through the valve structure. A rotation of only 90° of the cylinders operating concurrently is required in moving the cylinders from a closed to a maximum open position or vice versa.

While the foregoing specification sets forth the invention in detail, it is to be understood that various changes in shape, size and materials may be resorted to without departing from the spirit and scope of the invention as claimed.

Having thus described the invention, what I claim as new is:

A valve comprising an ovate-shaped casing, a pair of rotary valve elements mounted within the said casing and in rolling contact with each other, each of said rolls being provided with a circumferentially extending groove in its periphery which grooves register with each other when the valves are rotated to form a passage communicating the inlet and outlet of the casing, means for simultaneously operating the said rolls, a pair of stop shoulders formed on the internal wall of the casing and each roller having a transverse groove therein at an end of the first groove and a strip fastened in said transverse groove and having its edge remote from the end of the circumferential groove projecting from the periphery of the roll for engaging the shoulder to prevent the rolls being rotated beyond a position where the grooves in the rolls register with each other, said strips contacting each other when the rolls are moved into position to close the passage whereby said strips act as means to prevent leakage between the rolls.

In testimony whereof I affix my signature.

EDWARD S. KING.